Patented June 16, 1931

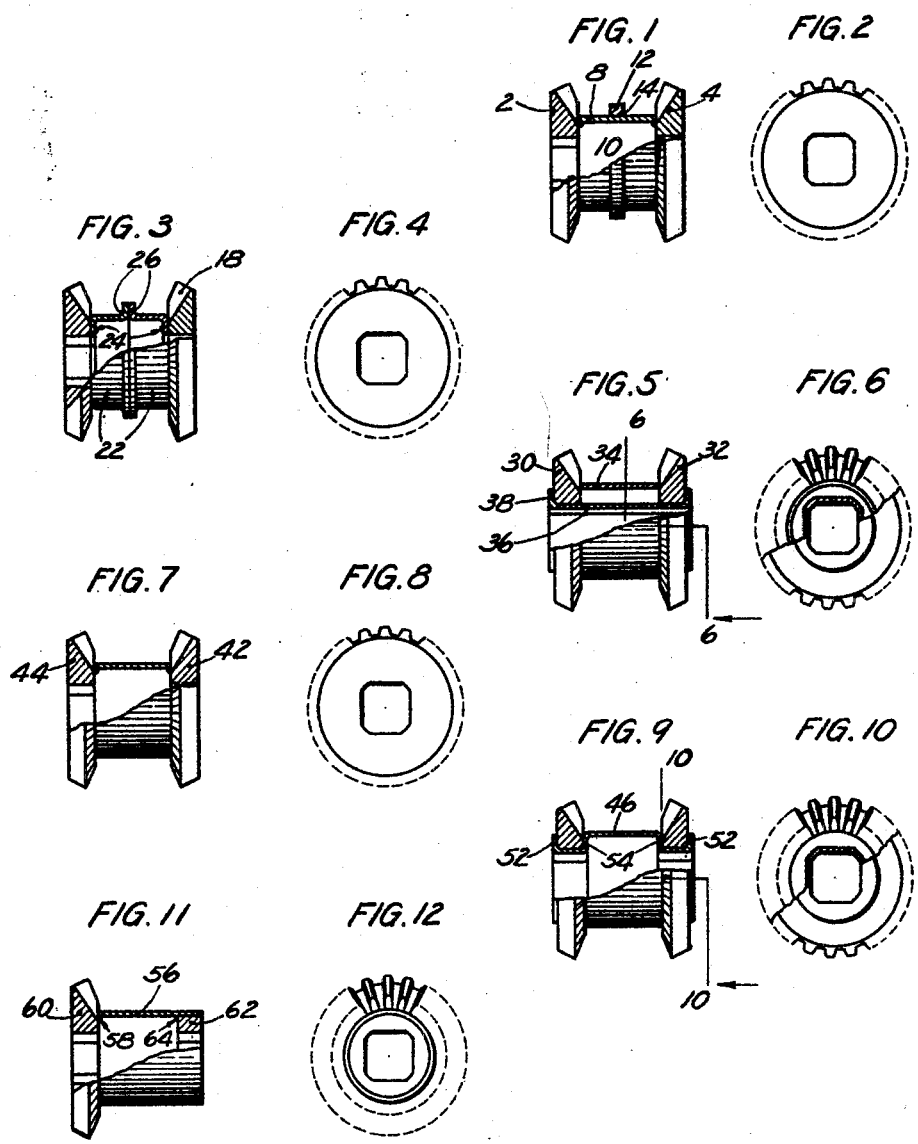

1,810,368

UNITED STATES PATENT OFFICE

JULIAN L. PERKINS, OF WEST SPRINGFIELD, AND HIRAM D. CROFT, OF SPRINGFIELD, MASSACHUSETTS, ASSIGNORS TO PERKINS MACHINE & GEAR COMPANY, OF WEST SPRINGFIELD, MASSACHUSETTS, A CORPORATION OF MASSACHUSETTS

GEAR CONSTRUCTION

Application filed January 13, 1930. Serial No. 420,521.

This invention relates to improvements in gears and is directed more particularly to the manufacture of gear assemblies wherein two or more parts are secured together to form a unitary structure.

It is often desirable in some cases to provide a bevel gear having a hub of some length extending from the inner side thereof or from the side towards which the teeth converge. Also in other cases a pair of bevel gears are carried at opposite ends of a central hub, the teeth of which converge inwardly or towards one another.

In such cases the hub is of course smaller in diameter than that of the gear or gears so that to provide the hub it must be turned or otherwise formed from a piece of material which has a diameter equal at least to the outer diameter of the gear. Obviously this is not only a waste of material, but the operation involves labor which adds to the cost of the finished gears and is objectionable.

As a further objection when the gears are formed in this way, the tooth forming tool is likely to cut into the hub. In fact, where the diameter of the hub is relatively large or as great as or greater in diameter than the inside root diameter of the gear the cutter in forming the teeth must necessarily cut into the hub. Also where the cutter angle of the gear or the included root angle intersects the hub, the hub is acted upon by the cutter in the tooth forming operation. This is objectionable because in many cases it is desired to provide hubs of large diameter which are accurate as to size and have unbroken surfaces throughout their length.

The principal object of this invention is to overcome the objections and disadvantages mentioned and is accomplished by the provision of novel improvements wherein a previously cut gear blank or blanks are secured to opposite ends of a hub or sleeve. In this way, not only is the forming of the hub from stock of a size equal to the diameter of the gear avoided to effect economy in manufacture, but the gears and hub may be of any desired relative dimensions with the hub free of tooth forming cuts because the tooth forming tool will not operate on the hub in any way.

The invention is adapted for broad application, but will be described for purposes of disclosure in connection with the accompanying drawings, in which Fig. 1 is an elevational view of a gear assembly partly in section showing certain novel features of the invention.

Fig. 2 is an end elevational view of the same.

Fig. 3 is a view similar to that of Fig. 1 showing a modified form of the invention.

Fig. 4 is an end elevational view of the structure shown in Fig. 3.

Fig. 5 is a view similar to Fig. 1 showing another modified form of the invention.

Fig. 6 is a partial sectional and elevational view taken on the line 6—6 of Fig. 5.

Fig. 7 is a view similar to that of Fig. 1 showing a further modified form of the invention.

Fig. 8 is a partial sectional and elevational view taken on the line 8—8 of Fig. 7.

Fig. 9 is a view similar to that of Fig. 1 showing a still further modification of the invention.

Fig. 10 is a partial sectional and elevational view taken on the line 10—10 of Fig. 9.

Fig. 11 is a view similar to that of Fig. 1 showing a further modification of the invention, and Fig. 12 is an end elevational view of the same.

Referring to the drawings, the invention will now be described:

In Fig. 1 there is shown a pair of bevel gears 2 and 4 the teeth of which are inclined towards one another or converge inwardly. These gears may be formed by cutting the teeth thereof in suitable blanks and they may have a central axial bore or opening 6 of any desired form therethrough.

A central hub preferably in the form of a tubular shell 8 is disposed between the gears 2 and 4 and concentrically thereof and has its opposite ends secured to the inner faces of the gears, preferably as by welding at 10. A ring 12 surrounding the hub intermediate its ends is secured thereto as by welding at 13. This ring may function to reinforce the hub or it may be utilized for various purposes depending upon the purposes for which the gear assembly is to be used.

It will be observed that the outer diameter of the hub is such that it would be cut by a tool or cutter forming the teeth in case it was integral with the gears at the time of the tooth forming operation. As is shown, while the hub is larger in diameter than the inside root diameter of the gears, yet by reason of the method of securing it as a unit to the gears it is of course not acted upon during a tooth forming operation. Such a relatively large hub with an uncut surface is much desired and is impossible when it is a part of the gear at the time of forming the teeth of the gear.

As the cut gears and hub are then secured together they provide a unified rigid structure which is equal in all respects to that where gears are formed at the ends of a central hub. Since the hub may be relatively large and is not marred by tooth forming operations the structure is far superior to those of the prior art and there is this important consideration, the manufacturing cost of the structure is much less than of gears produced according to the common prior art method.

The bore of the gears may be either round or square as shown and it will be noted that the gears provide the bore so that the structure may be carried on a shaft or the like without it necessarily contacting with the hub.

In Figs. 3 and 4 gears 18 and 20 are disposed at opposite ends or a hub formed from a pair of hub members 22. Each of these members 22 have inwardly extending flanges 24 at their outer ends and outwardly extending flanges 26 at their inner ends, the former of which lie against the gears while the latter lie against one another as shown. The contiguous faces of the flanges 24 and gears and the flanges 26 are joined as by welding so that a unitary structure consisting of a central hub with gears at opposite ends thereof is provided.

In Figs. 5 and 6 gears 30 and 32 at opposite ends of a hub 34 have a central tubular member 37 extending therethrough. Outer flanges 38 on the member 36 bear against outer faces of the gears and preferably bind the parts together to provide the desired unified structure. The contiguous faces of the parts may be welded if desired as in the former cases.

In Figs. 7 and 8 gears 40 and 42 disposed at opposite ends of a hollow hub member are secured thereto by welding or in some other suitable manner in order to provide the unified structure.

In Figs. 9 and 10 a central hub 46 has reduced portions 48 extending through bores in the gears with outer flanges 50 for bearing against the outer faces of the gears and forcing the same against wall portions 52 and the parts may be welded if necessary so as to provide a strong rigid structure. It will be noted that the hub in this case as in the others is relatively large in diameter so as to provide the most effective support and tie member for the gears.

In Fig. 11 a hub 56 is secured by welding at 58 to the inner face of a gear 60 while a ring-like member 62 inserted in the free end of the tube is welded as at 64. The gear 60 and member 62 may be provided with axial openings as shown and in this case a single gear and a relatively large hub are secured together to form the rigid unified structure desired.

As will be observed it is possible to provide a unified gear assembly consisting of a gear or gears and hub secured together in a rigid and economical manner. Not only is the hub securely fixed to the gears, but its outer diameter may be relatively large with respect to the gear and at the same time free of cuts made by tooth forming tools. It is desirable to employ hubs of the relatively large diameter shown because in that way the jointure of the gear and hub is located away from the axial center of the assembly and disposed near the periphery where the utmost rigidity and strength can be obtained.

Having described the invention, what we desire to secure by Letters Patent of the United States is:

1. A gear assembly comprising in combination, a gear having peripherial teeth converging towards its axis at a side thereof, a hub disposed at said side concentrically thereof which is joined thereto by welding to provide a unified rigid structure, the said hub having a part which intersects the included angle of the root of the teeth of said gear.

2. A gear assembly comprising in combination, a gear having peripherial teeth converging towards its axis at a side thereof, a hub disposed at said side concentrically thereof which is joined thereto by welding to provide a unified rigid structure, the said hub having a part which intersects the included angle of the root of the teeth of said gear, the diameter of said hub being greater than the root diameter of the gear at said side.

3. A gear assembly comprising in combination, a central hollow hub member, a pair of gears disposed concentrically thereof at opposite ends which is welded thereto to provide a rigid unified structure, the said gears being provided with teeth which converge towards one another and the diameter of said hub being greater than the root diameter of at least one of said gears.

In testimony whereof we affix our signatures.

JULIAN L. PERKINS.
HIRAM D. CROFT.